United States Patent [19]

Takahashi et al.

[11] Patent Number: 4,937,052
[45] Date of Patent: Jun. 26, 1990

[54] UNDERGROUND CHEMICAL REACTOR

[75] Inventors: Hideaki Takahashi; Tetsuo Shoji; Katsuto Nakatsuka; Hiroyuki Abe, all of Sendai, Japan

[73] Assignee: Tohoku University, Sendai, Japan

[21] Appl. No.: 228,742

[22] Filed: Aug. 5, 1988

[30] Foreign Application Priority Data

Aug. 12, 1987 [JP] Japan .............................. 62-200066

[51] Int. Cl.$^5$ .............................................. B01J 3/02
[52] U.S. Cl. ...................................... 422/242; 166/57; 166/300; 166/302; 166/305.1; 166/308; 210/747
[58] Field of Search .................. 422/242; 166/57, 300, 166/302, 305.1, 308; 210/747

[56] References Cited

U.S. PATENT DOCUMENTS

| | | | |
|---|---|---|---|
| 3,464,885 | 9/1969 | Land et al. | 162/17 |
| 3,606,999 | 9/1971 | Lawless | 422/231 X |
| 3,805,885 | 4/1974 | Van Huisen | 165/45 |
| 3,858,397 | 1/1975 | Jacoby | 166/302 X |
| 3,864,208 | 2/1975 | Van Huisen | 176/39 |
| 4,085,795 | 4/1978 | Gill | 165/45 |
| 4,248,306 | 2/1981 | Van Huisen et al. | 166/305 |
| 4,272,383 | 6/1981 | McGrew | 210/741 |
| 4,534,413 | 8/1985 | Jaworowsky | 166/302 |
| 4,564,458 | 1/1986 | Burleson | 210/747 |
| 4,678,039 | 7/1987 | Rivas et al. | 166/302 X |
| 4,705,113 | 11/1987 | Perkins | 166/302 |

FOREIGN PATENT DOCUMENTS 0131499  1/1985  European Pat. Off. .

OTHER PUBLICATIONS

Rappe et al., "Mile-deep Reactor Destroys Sludge with Ease", Water/Engineering and Management, Sep. 1985.

Primary Examiner—Robert J. Warden
Assistant Examiner—Timothy M McMahon
Attorney, Agent, or Firm—Fleit, Jacobson, Cohn, Price, Holman & Stern

[57] ABSTRACT

An underground chemical reactor having a closed loop reactor which includes at least a reaction component inlet tube and a reaction product outlet tube and a casing pipe consisting of a double or triple tube and the circulating system for a reaction component such as raw material sludge and a direct chemical reaction system for the reaction component with the deep underground high temperature water of a hot water source formed by a natural hot water source of an artificial crushed zone at a depth of more than 1,000 m, thereby an oxide magnetic material such as soft ferrite, hard ferrite, each kind of ceramics or heat-resisting materials such as xonotlite, dielectric materials, clay materials may be made in the underground chemical reactor.

2 Claims, 16 Drawing Sheets

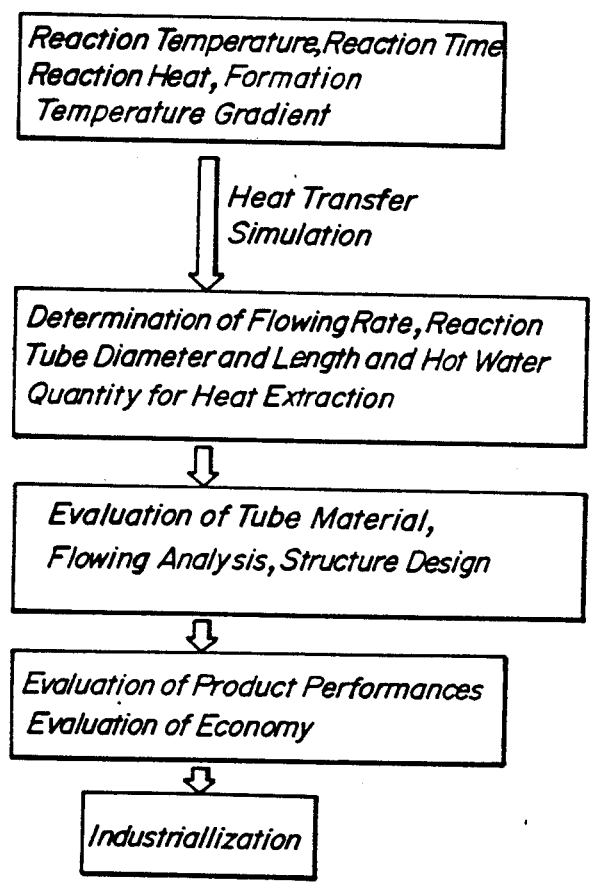

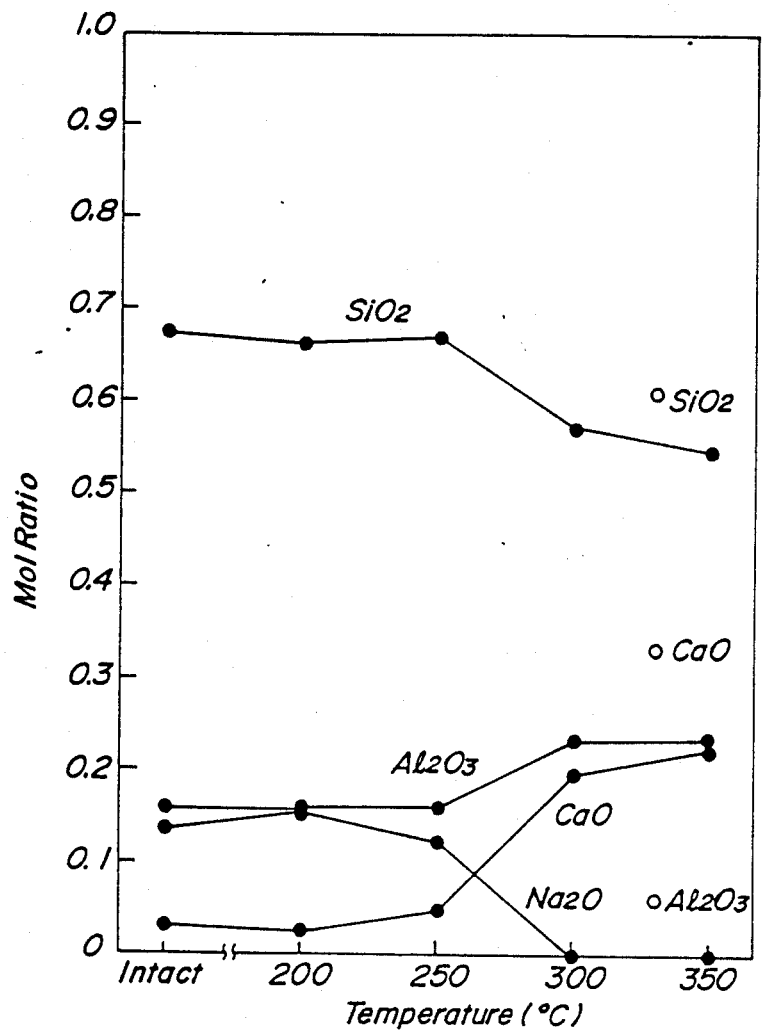

FIG_12a
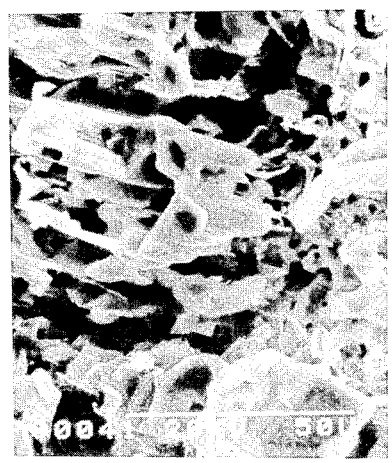
FIG_12b
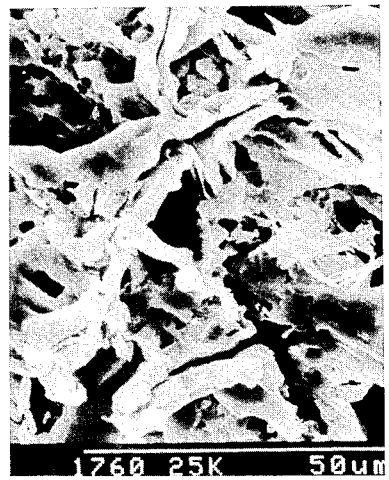
FIG_12c
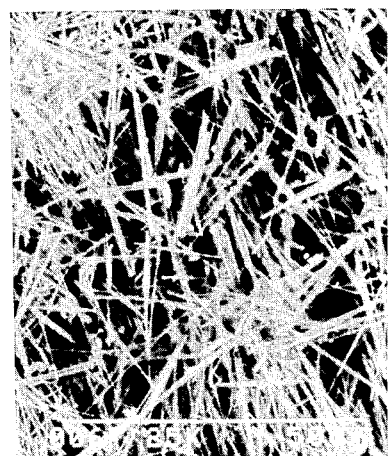
FIG_12d

FIG_14
FIG_15
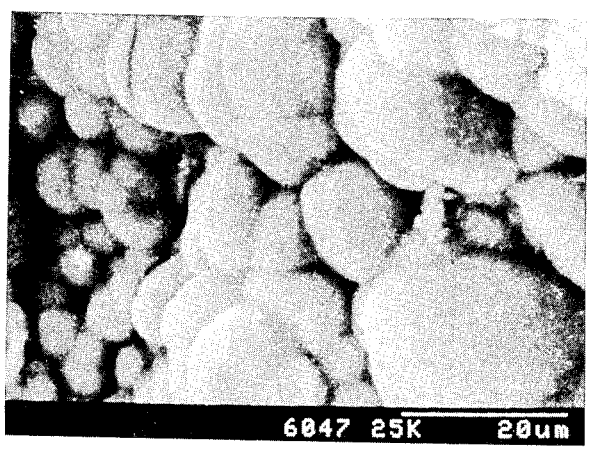

UNDERGROUND CHEMICAL REACTOR

BACKGROUND OF THE INVENTION

1. Field of the Invention

The present invention relates to a geothermal energy utilization technique, and an object of the present invention is to provide a reactor design technique for realizing a new chemical reaction process under the ground for the purpose of synthesizing hot water, manufacturing fuel or extracting resources by effectively utilizing geothermal energy abundant in Japan.

2. Related Art Statement

In prior geothermal energy utilization, it was rare to directly utilize geothermal energy under the ground, but it was common to utilize geothermal energy as hot water. As a utilization method on the surface of the earth, there is generation of electric power with the use of steam, and as a direct utilization method hot water is used for such uses as for a hot house, local heating, drying equipment, snow melting and the like (see Japanese Patent No. 1,134,850 (Japanese Patent Application Publication No. 57-27,282), Japanese Patent No. 1,231,142 (Japanese Patent Application Publication No. 56-51,274)).

In such prior type geothermal energy utilization, there are many problems such as large energy loss during transfer to the surface of the earth, and a heat insulating provision is inevitable, requiring post-treatments, for example, hot water taken out of the ground is necessary to be led back underground after waste water treatment, and an increase in expenses is unavoidable.

On the other hand, a high temperature, high pressure reactor such as an autoclave used for each kind of material synthesis utilizes heat generated by electric power and is low in thermal efficiency, and also has a difficult point in synthesis for realization, viewed from production cost because it is an energy consumption type, and further design and operational conditions are severe for maintenance requirements, and moreover, there is required a high pressure pump for inserting a reaction material. These drawbacks are viewed as a normal of course.

In a prior technique, there has not been known any example of direct synthetic reaction device under the ground using geothermal energy.

SUMMARY OF THE INVENTION

By taking the above points into consideration, the present invention aims to solve such drawbacks that a chemical reaction by a high temperature, high pressure reactor (autoclave) hitherto used for synthesis of each kind of materials is low in thermal efficiency because of the utilization of heat generated by electric power, high in production cost as a high energy consumption type production, difficult in cost for practical use in the synthetics industry, and also requires a high pressure pump, and hence envisions the utilization of geothermal energy as it is, and proposes realization of a chemical synthetic reaction cheaply with the aid of the high heat and high pressure of crustal energy.

An object the present invention is to provide an underground chemical reactor comprising a closed loop reactor composed of at least a reaction component inlet tube and a reaction product outlet tube and a casing pipe consisting of a double or triple tube, said closed loop reactor being inserted to reach a deep hot water source of at least more than 1,000 m of underground, and material-converting means by a direct chemical synthetic reaction under the rest or fluid condition at an underground high temperature portion.

Another object of the present invention is to provide an underground chemical reactor, wherein said underground deep hot water source is a hot water source formed by a natural hot water source or an artificially crushed zone.

A further object of the present invention is to provide an underground chemical reactor, wherein said closed loop reactor comprises a casing pipe, a raw material sludge tube closed at a lower end and inserted into said casing pipe, a product sludge pipe having an open lower end inserted into said sludge tube, a pump connected to the upper open end of said casing pipe, a raw material sludge supply connected to the upper open end of said raw material sludge tube a product sludge tank connected to the upper open end of said product sludge tube, a hole provided in a casing pipe at a deep portion of more than 1,000 m from the ground, wherein the hole is located in a vicinity of a hot water source formed by a natural hot water source or an artificial crushed zone, and the material conversion takes place by a direct chemical synthetic reaction with a high temperature hot water at deep under ground under the rest or circulating condition of the raw material sludge.

As an example of products which the invention can be applied to, mention may be made of oxide magnetic material such as soft ferrite, hard ferrite and the like, each kind of ceramics or heat-resisting materials such as xonotlite and the like, dielectric materials, clay minerals and the like.

BRIEF DESCRIPTION OF THE DRAWINGS

For a better understanding of the invention, reference is made to the accompanying drawings, in which:

FIG. 2 is an evaluation flow chart for industrializing the underground chemical reactor according to the invention;

FIG. 11 is a characteristic view showing the surface analysis result of plagioclase before and after the dissolution test by scanning electron microscope of the same test;

FIGS. 12(a), 12(b), 12(c) and 12(d) are SEM photographs of plagioclase at the dissolution test temperature of 250° C., 300° C., 330° C. and 350° C. for showing surface shape changes of plagioclase after dissolution reaction in the same test;

FIG. 14 is a photograph of xonotlite adhered to the test loop inner wall in the same test;

FIG. 15 is an SEM photograph of deposits in the same test; and

Throughout different views of the drawings, 1 is a surface of the ground, 2 is a casing pipe, 2A is a hole, 3 is a raw material sludge tube, 4 is a product sludge, 5 is a hot water source, 6 is a valve, 7 is an injection tube, 7A is an injection inlet, 8 is a product unloading tube, 9 is a pump, 10 is a water tube, 11 is a casing pipe, 13 is a natural crushing zone, 21 is a circulating water, 22 is a pipe line, 23 is a valve, 24 is a reservoir tank, 25 is a pump, 26 is an accumulator, 27 is a preheater, 28 is a gauge, 29 is an autoclave, 30 is a thermocouple, 31 is a scaling pipe, 32, 33 are refrigerators, 34 is a line filter, 35 is a relief valve, 36 is a check valve, 37 is a flowmeter, 38 is a drain, 39 is a sample, 40 is a resolving testing portion, 41 is a sampling jig.

DESCRIPTION OF THE PREFERRED EMBODIMENT

The invention will now be described in detail by referring to embodiments illustrated in the accompanying drawings.

EXAMPLE 1

Figure 1:
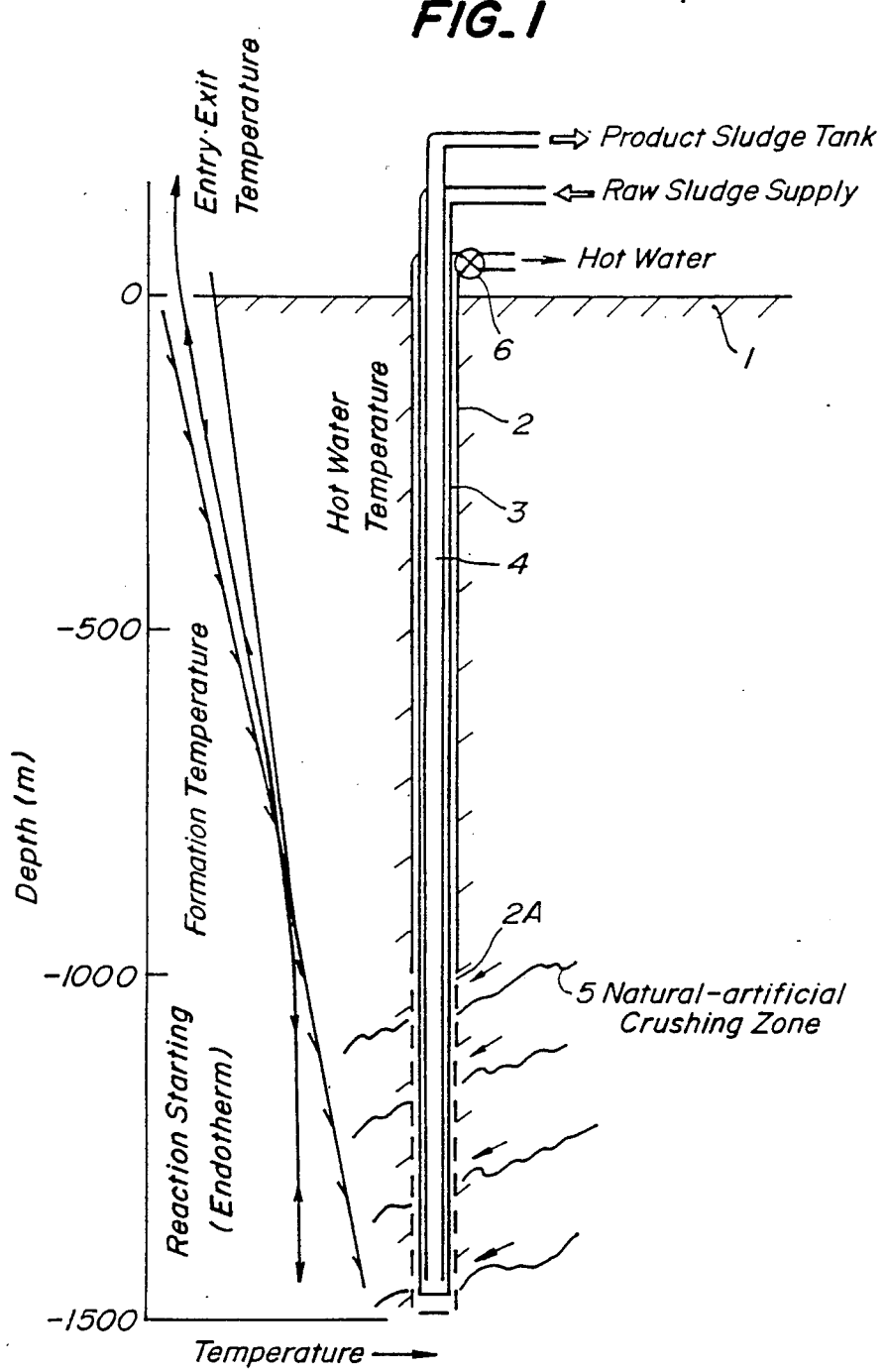
FIG. 1 is an explanatory view showing the underground chemical reactor according to the invention.

The basic construction of a device is shown in FIG. 1. In the drawing, 1 is the surface of the earth and 2 shows a casing pipe. In the invention, a raw material sludge tube 3 closed at one end is inserted into the casing pipe 2, and a product sludge tube 4 is inserted thereinto. Reference numeral 5 is a natural hot water source or a deep hot water source formed by artificial crushing. At a portion adjacent the deep hot water source 5 of the casing pipe 1 is bored a hole 2A for drawing hot water. Reference numeral 6 is a valve. In order to operate this device, there is required a natural geothermal reservoir where the geothermal heat is naturally imparted and a high temperature rock body enabling to extract hot water by introducing artificial underground cracks.

The construction of the device will be explained next. The reactor is fundamentally composed of a triple tube as illustrated. However, in case of a special material synthesis, a double tube may be used. Reference numeral 3 is a tube for inserting a raw material, and a reaction starts when the tube 3 reaches the depth having soil temperature necessary for reaction by underground circulation. Necessary conditions at the place where the device is formed are that a formation is at high temperature and that supply of heat can be ensured. Under the depth of about 1,000 m of underground where the reaction was started, the formation temperature is lowered by an endothermic effect of the reaction. In order to continue the reaction, it is necessary to keep the formation temperature constant, and it is also necessary to introduce not only heat of the formation directly attached to the tube but also heat within the formation apart from the tube to some extent. In the natural geothermal area, natural hot water plays a role of heat exchange. Here exchange is further possible within the formation by forming an artificial hot water source by introducing artificial underground cracks. Therefore, even at a high temperature rock area, if the fluid channel of a hot fluid is secured for supplying heat to a well, the technique of the invention can be applicable. In order to increase heat exchange efficiency, hot water is appropriately drawn up and the hot water is circulated within the formation. Sludge which becomes a product by proceeding with the reaction is collected from a product sludge tube 4.

Thickness, length and structure of each tube used as a reactor are designed according to reaction rate inherent to the material for synthesis, consumption heat, further estimated production output and underground temperature distribution of the area for setting the reactor. A stirrer such as a baffle plate is fitted within the tube, if necessary. The tube used for the reactor is protective metal. However, the material depends upon surroundings necessary for synthesis, and in case of high temperature anti-alkali corrosion, use may be made of a super alloy such as Inconell, Hastelloy and the like, in case of high temperature anti-acid corrosion, use may be made of high chrome alloy and the like, and in case of high temperature neutrality, use may be made of stainless steel, low alloy steel and the like.

Moreover, circulation and scooping amount of hot water are carried out in expectation of thermodynamic simulation of formation temperature change in the vicinity of the reactor for previously keeping balance between the geothermal and the supply amount.

The left half of FIG. 1 shows a temperature distribution in an underground high temperature rock body, and also shows that a synthetic reaction starts at the depth of 1,000 m of underground by an endothermic reaction.

FIG. 2 shows steps of planning and enforcement required for industrialization of the underground chemical reactor according to the invention, in which reaction temperature, reaction time, reaction heat and formation temperature gradient are firstly examined, heat transmitting simulation is planned, fluid carrying amount, diameter and length of a reaction tube and hot water amount for collecting heat are determined, evaluation of tube material, flow analysis and structure planning for reaction are carried out, evaluation of product efficiency and evaluation of economy of reaction are carried out, and then the advisability of industrialization is determined.

FIG. 1 shows a cycle for carrying out a reaction as heat-exchanging with a hot water source at the outside within a closed tube of the raw material sludge tube 3 which end is closed, but the present invention can react not only within the closed tube but also through an open tube according to the raw material.

EXAMPLE 2

Figure 3A:
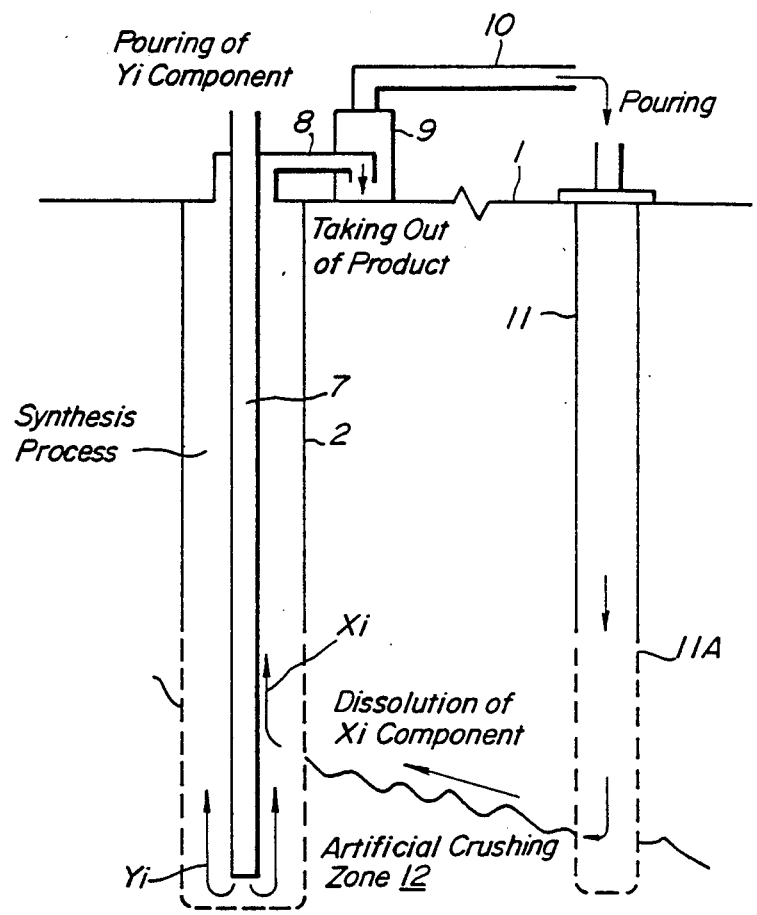
FIGS. 3(a) and 3(b) are explanatory views showing other embodiments of the present invention.

The fundamental construction of the device is shown in FIG. 3(a). The point different from Example 1 is whether a part or the whole of the raw material is utilized from the components in hot water gushing out of underground or is utilized by positive eluation, and the point of utilizing the underground rock body as an energy source necessary for the reaction is common to each other.

In FIG. 3(a), 1 is the surface of the earth, and 2 shows a casing pipe having a hole 2A at the end. In the present invention, an injection tube 7 of a synthetic component (Yi) is inserted into the casing pipe 2, the end thereof is inserted until it reaches an artificial crushing zone 12 provided at the underground depth, the synthetic component (Yi) is released in the casing pipe 2, dissolved in hot water of the artificial crushing zone 12 and joins with other synthetic component (Xi), and is pumped in a pump 9 through a product unloading tube 8 as carrying out a synthetic process, so that the pumping of hot water is carried out by utilizing a temperature of hot water between the synthetic components (Xi) and (Yi) by pouring water from other well tube 11, a hole 11A at the end of the well tube 11 is opened to the artificial crushing zone 12, the other component (Xi) is dissolved in hot water generated in the water pouring and the artificial crushing zone 12, and entered into the same tube through the hole 2A of the casing pipe 1 connected by the artificial crushing zone 12.

Figure 3B:
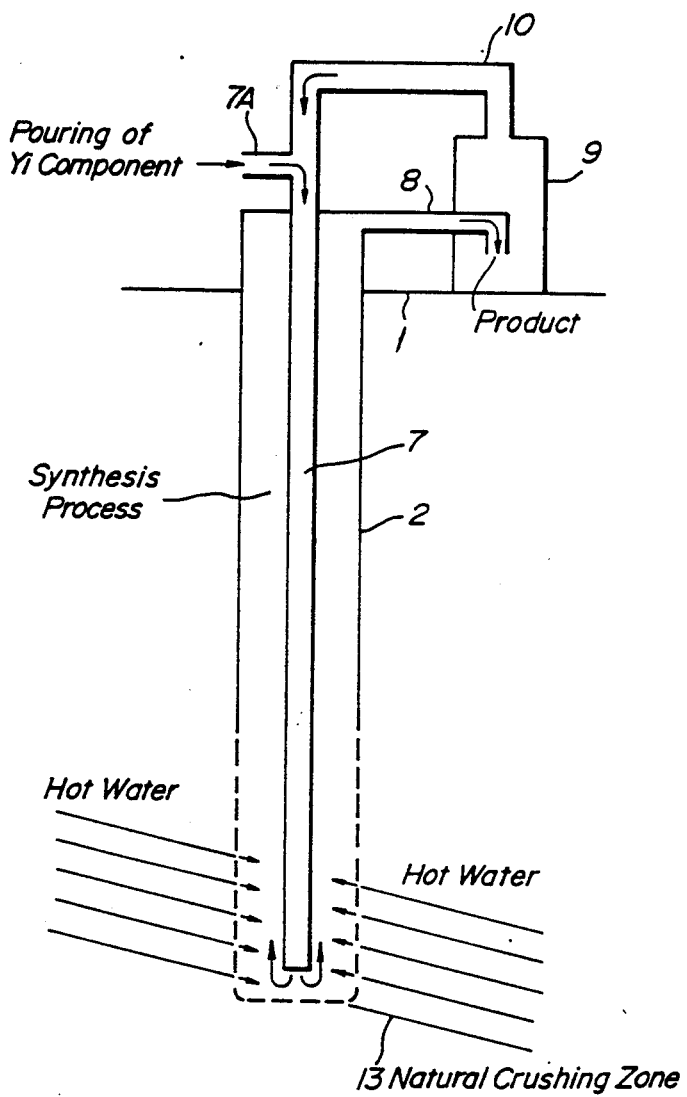

FIG. 3(b) shows another embodiment of the underground chemical reactor according to the invention. In this case, the same casing pipe 2 as in FIG. 3(a) is inserted into a hot water source consisting of a natural crushing zone 13 formed in the underground depth, an injection tube 7 of a synthetic component (Yi) is inserted in the pipe 2, the synthetic component (Yi) is injected from an injection inlet 7A to joint with hot water of the underground depth, mixed with other synthetic component (Xi) contained in hot water, and a synthetic process is carried out. A product is collected from a product unloading tube 8, and excessive hot water is joined with the synthetic component (Yi) through a water tube 10 by a pump 9 and returned to the underground through the injection tube 7.

The synthesis of calcium silicate, for example, can be realized by simply injecting hot water with pressure in a rock body containing these constituent elements, or adding the other components in hot water containing a part of these elements from halfway, taking out and controlling the temperature fluid condition on that case.

In an experiment of reproducing such condition experimentally, under the condition of temperature of 250°-350° C., the pressure of 18 MPa and the flow rate of 5 m/sec, with the use of granite as a raw material, synthesis of xonotlite, sillimanite, apatite and the like proved successful. Further, the manufacture and recovery of non-crystal amorphous proved successful by quenching hot water containing dissolved ions.

According to the invention, the following advantages can be expected by installing a chemical reactor under the ground.

(1) Since a natural geothermal energy is utilized, a raw material and energy source can be saved or become unnecessary.

(2) Since the pressure reactor is installed under the condition of receiving pressure inside from base rock, the reactor is essentially of safe construction against any abnormality.

(3) Since a pressure-resisting wall can be made thin as compared with the pressure reactor installed on the surface of the earth, the cost of installation is mitigated by a large margin.

(4) An ultracontinuous reactor can easily be installed within a small surface area.

The fundamental experiment is as follows:

(1) Outline of the Experiment

Figure 4:
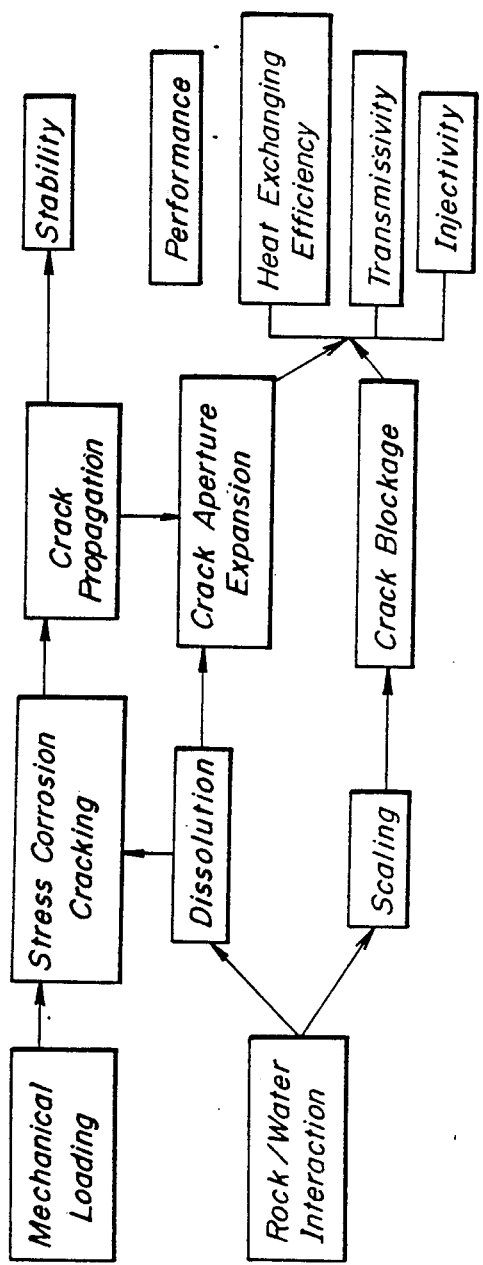
FIG. 4 is an analysis flow chart showing the relation of crack aperture expansion, crack blockage of a deposit, performance deterioration and heat exchanging efficiency of an underground crack reservoir layer, transmissivity, injectivity and the like in case of utilizing an underground hot water source.

In case of extracting geothermal energy from a deep crush high temperature dry rock body (HDR: Hot Dry Rock), it has become apparent that formation and utilization of underground artificial cracking by hydraulic fracture and the like is very effective, a crack forming experiment has actively been conducted in Japan and various Western countries in recent years. In crust energy development with the use of this hydraulic fracture technique, it is important to previously experimentally measure various breaking kinetic amounts of a rock body aimed at, and for that reason, a stress corrosion cracking test under simulant hot water surroundings is necessary and inevitable. Further, since stress corrosion cracking is a mechanochemical phenomenon, it is necessary to know a reaction behavior of rock and hot water in order to observe its mechanism. In addition to the above, a study of rock/hot water interaction has an important role for securing extractable heat for a long period of time by controlling and stably maintaining artificial cracks after hydraulic fracturing. In a case considered from a practical point of view, the higher the HDR temperature, the more advantageous, but under such environmental condition, it is necessary to urgently grasp crack aperture expansion due to rock/hot water interaction, or crack blockage brought by deposition of silica and the like, and further performance deterioration of underground crack reservoir caused thereby. FIG. 4 is a flow chart of analysis showing the above relation.

As shown in FIG. 4, the analysis of stability is carried out by a route of mechanical loading→stress corrosion cracking→crack propagation and another route of rock/water interaction→dissolution→stress corrosion cracking→crack propagation. The performances of analysis of heat exchange, transmissivity and injectivity are carried out by taking into account by the route of rock/water interaction→dissolution→stress corrosion cracking→crack propagation→crack aperture expansion and by another route of rock/water interaction→dissolution→crack aperture expansion, and by the still another route of rock/water interaction→scaling→crack blockage.

This study is based on the above point of view, examining dissolution behavior of granite to hot water by taking temperature in parameter with the use of an open loop type autoclave, and evaluating dissolution rates of each mineral for construction granite with the use of reaction kinetic means. Some study is also made with respect to deposition of elements solved in hot water and scaling by deposition.

(2) Laboratory device and Laboratory method (2)-1 Rock sample and Deposition tube A rock sample used for a dissolution test is granodiorite produced in Iidatemura, Fukushima Prefecture, and its mean grain diameter is 1.5 mm. Its mineral composition is shown in Table 1.

TABLE 1

| Mineral | Quartz | Alkali-feld orthoclase | Plagioclase | | Biotite |
|---|---|---|---|---|---|
| | | | Albite | Anorthite | |
| Symbol | Qz | Or | Ab | An | Bt |
| Molecular formula | $SiO_2$ | $KAlSi_3O_8$ | $NaAlSi_3O_8$ | $CaAl_2Si_2O_8$ | — |
| Wt % | 38% | 22% | 25% | 9% | 6% |

The sample was used for a test by molding into a laminar test piece of about 27×27×4 mm, polished with an abrasive for the purpose of removing and smoothing a surface layer, further degreasing and cleaning with acetone, and finally applying vacuum-drying thereto.

The deposition tube (outer diameter: 42.7 mm, thickness: 4 mm, length: 441 mm) used for a deposition test is a common high-pressure piping carbon steel pipe (STS) for geothermal piping or a high-temperature piping carbon steel pipe (STPT), a piping alloy steel pipe (STPA) or the like.

(2)-2 Laboratory device

Figure 5:
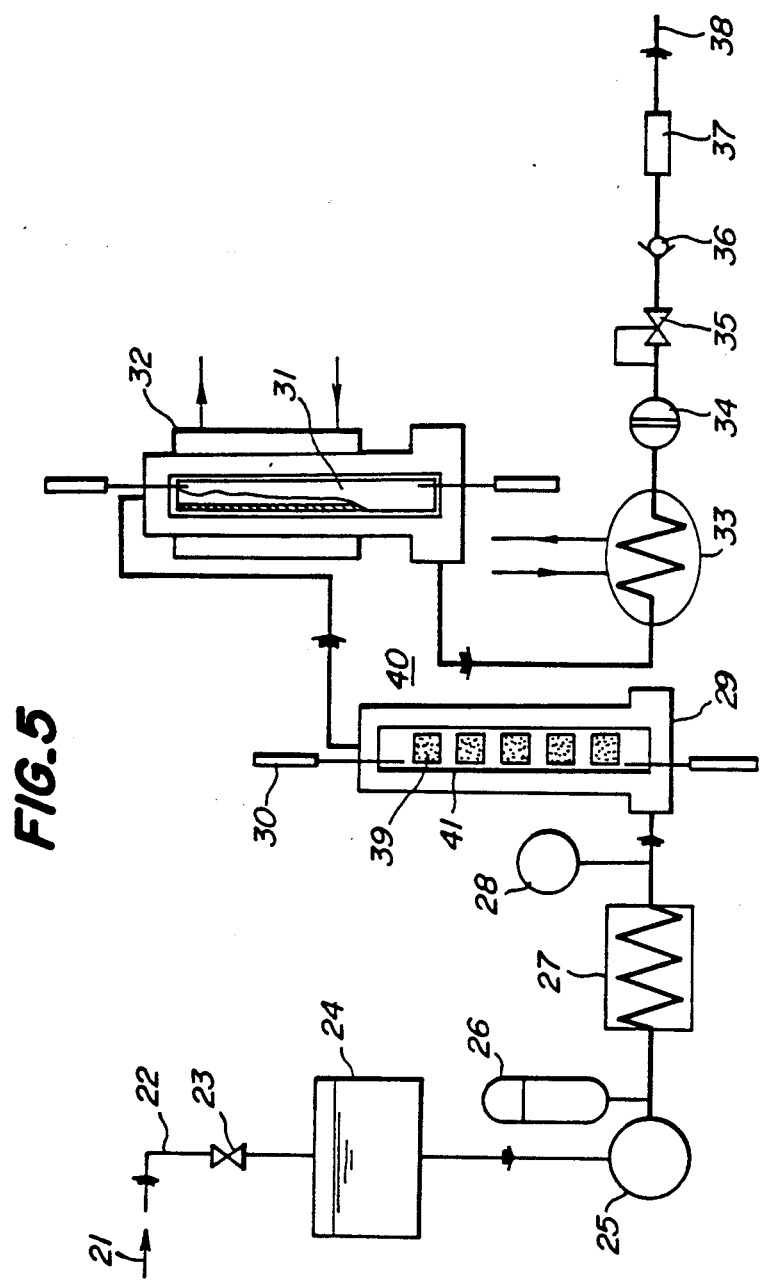
FIG. 5 is a schematic view showing the system of a cyclic hot water device operable at 400° C. and 20 MPa used in a fundamental test of the present invention.

FIG. 5 shows an outline of the laboratory device used in the present experiment.

In FIG. 5, 21 is circulating water, 22 a pipe line, 23 a valve, 24 a reservoir tank, 25 a pump, 26 an accumulator, 27 a preheater, 28 a gauge, 29 an autoclave, 30 a thermocouple, 31 a scaling pipe, 32 and 33 coolers, 34 a line filter, 35 a relief valve, 36 a check valve, 37 a flowmeter, 38 a drain, 39 a sample, 40 a dissolution testing portion, and 41 a sample piece jig.

Figure 6:
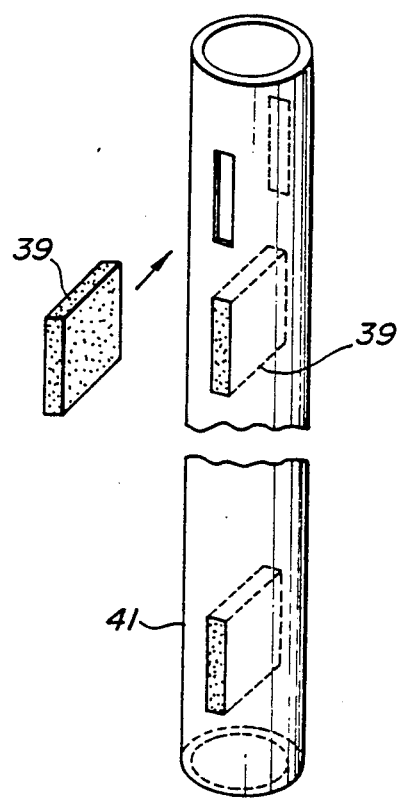
FIG. 6 is a schematic view of a sample tube shown in FIG. 5.

The circulating water is pure water having the conductivity of less than 0.1 μs which is purified through an ion exchanger of the existing loop. The water was stored in the reservoir tank 24, delivered to the high pressure quantitative pump 25 (maximum output pressure: 20 MPa, maximum output amount: 20 l/hr) with pressure, raised to hot water of a predetermined temperature at the preheater 27 and supplied to the dissolution testing portion 40. To this dissolution testing portion 40 are inserted five sample pieces 39 mounted on the sample piece jig 41 shown in FIG. 6 in series in the flow direction. The hot water after the dissolution reaction passed through the scaling pipe 31 having a temperature gradient by the cooler 32, caused a deposition reaction, thereafter passed through the cooler 33, circulated through the line filter 34, the relief valve 35, the check valve 36, the flowmeter 37 and discharged into the drain 38. In addition, all loops of the pipe line 22 are made of stainless steel, the highest use temperature is 400° C., and the highest use pressure is 20 MPa. The present experimental loop aims at a model of the actual geothermal environmental system, but in the actual system, a closed loop is imaged, while the present loop is an opened loop for accelerating dissolution for short time evaluation. This is a different point of laboratory device from the embodiment shown in FIG. 1.

(2)-3 Laboratory method

A dissolution test was conducted in hot water surroundings at 200° C., 250° C., 300° C., 330° C. and 350° C. under pressure of 18 MPa. The experimental loop was operated at a certain flow rate of 10 l/hr, and flow velocity on the sample piece surface is 0.183 cm/s. Sample pieces are dried in vacuum before and after the dissolution test, respectively, weight measured by a laboratory balance (precision: 10 μg), and reduced weight was obtained from the difference thereof (in this case, a small amount of mineral was fallen off from the sample piece, but included in reduced weight). It was further confirmed from a preliminary test that there is no difference in reduced weight between the upper stream and the downstream (distance: 37 cm) of the sample pieces placed in the autoclave in series in the flow direction, so that the flow rate of the present test is considered to be sufficiently fast with respect to the dissolution rate of rock.

Measurement of loss of thickness by dissolution of every mineral after the dissolution test was to magnify the cross section of the sample piece to 10 times by using a universal projector and to measure unevenness of the surface by precision of ±0.05 mm. The sample piece after the test was observed by using a binocular microscope (5–45 magnifications), a scanning type electron microscope (SEM) and an X-ray microanalyzer (EPMA).

On the other hand, the deposition test was conducted in parallel to the dissolution test. The hot water after the dissolution reaction was introduced into the deposition testing portion given a sudden temperature drop (about 3° C./cm) thereto, thereby causing deposition of silica and the like on the deposition tube. The deposition tube after the test was cut into half in the axial direction, and the scale adhered surface was observed and analyzed by SEM, EPMA and X-ray diffraction.

(3) Result and Observation of Dissolution Test

(3)-1 Temperature Dependency of Dissolution Rate

Figure 7:
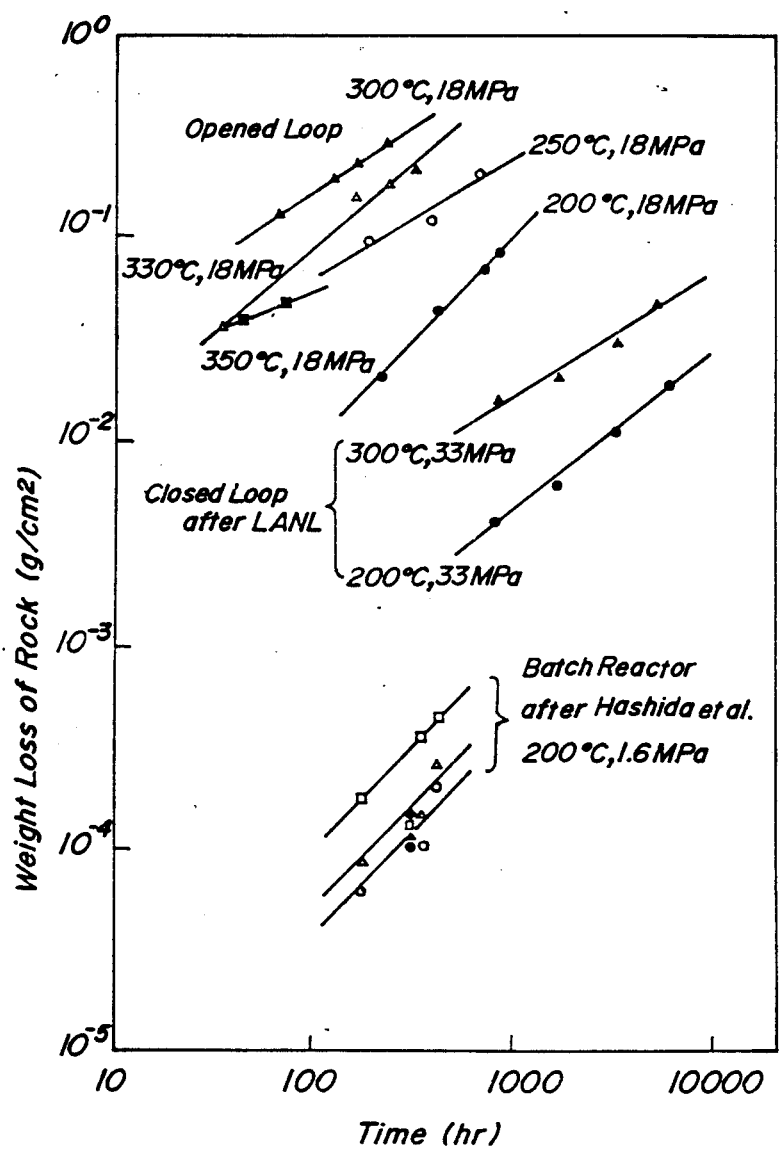
FIG. 7 is a characteristic view between the time elapsed and the rock weight loss showing the dissolution behavior of granite in high temperature water shown in FIG. 5.

FIG. 7 shows the relation between reduced weight and time per unit area obtained by the dissolution test in hot water surroundings at each temperature. FIG. 7 also shows the result of Hashida et al (1983) who conducted the dissolution test in hot water surroundings of 200° C. and pressure of 18 MPa in a bath autoclave with the use of the same granite produced in Iidatemura, and the result of Brown, M. C. et al (1978) at Los Alamos National Laboratory (LANL) who conducted the dissolution test in a hot water circulating closed loop at 200° C., 300° C. and pressure of 33 MPa with the use of biotite granodiorite of Fenton Hill geothermal reservoir. Since the hot water was under the fluid condition and the hot water supplied to the dissolution testing portion was pure water including no solved element, the present test is large in reduced weight per unit area and maximum in corrosion rate among three.

Figure 8:
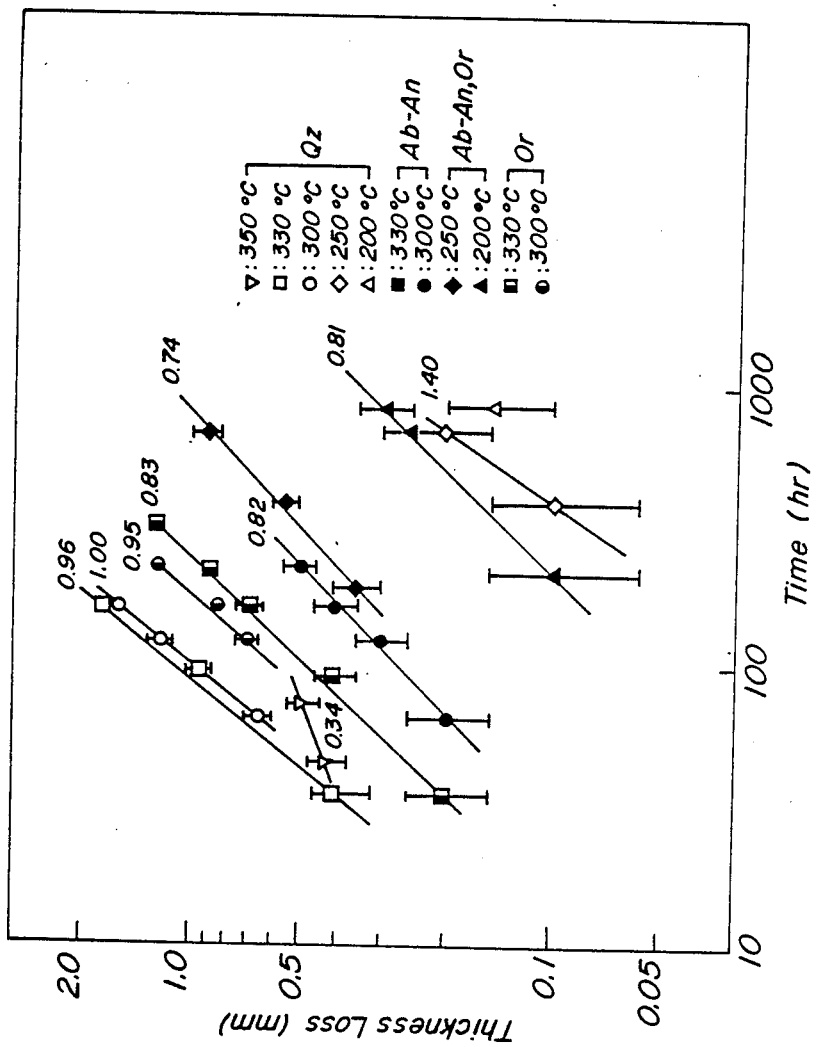
FIG. 8 is a comparative characteristic view of the thickness loss of main constituent materials (quartz, feldspar, plagioclase) of granite in high temperature hot water surroundings up to a temperature of 350° C. shown in FIG. 5.

(3)-2 Relation between dissolution amount and time of each mineral, and temperature dependency of dissolution rate In the above (3)-1, the dissolution rate was evaluated by taking the whole sample piece, that is, the whole granite, but in order to study more in detail, it is understood that each mineral in the sample piece and each mineral for constructing granite should be evaluated. Therefore, as a result of observing the sample piece after dissolution test by using a binocular microscope, each mineral for constructing granite is not equally dissolved, but classified into mineral which is liable to dissolve at each temperature and mineral which scarcely dissolves. For the purpose of representing the loss of thickness by dissolution by numerical value, losses of thickness by dissolution were observed by using a universal projector and the relation between the dissolution time and the loss of thickness by dissolution was plotted. The result is shown in FIG. 8. Among four main minerals for constructing granite, biotite having a very small solving amount at the whole temperature zone was omitted. The straight lines were drawn by a method of least square approximation.

Here, when dissolution reaction is considered as a primary reaction, the dissolution rate is described by the following equation.

$$\frac{dc}{dt} = \frac{A}{M} k (C_{sat} - C) \quad (1)$$

Where, k is a rate constant, A is a reaction area, M is a mass of water to be reacted, C is a solved element concentration, and Csat is a solved element saturated concentration. Since the present test is of an opened loop, the solved element concentration around the sample piece is very small to be regarded as $C/C_{sat} < 1$, so that when the equation (1) is solved by the initial conditions $t=0$ and $c=0$, the following equation is obtained.

$$C = \frac{A}{M} k (C_{sat} - t) \quad (2)$$

Let the specific volume of granite be v, the following relation can be established between loss of thickness by dissolution Th lose and c.

$$Th \text{ lose} = \frac{Mv}{A} C \quad (3)$$

Therefore, when the equation (2) is substituted for the equation (3), the following equation is obtained.

$$Th \text{ lose} = v \, C_{sat} \, k \, t \quad (4)$$

Figure 9:
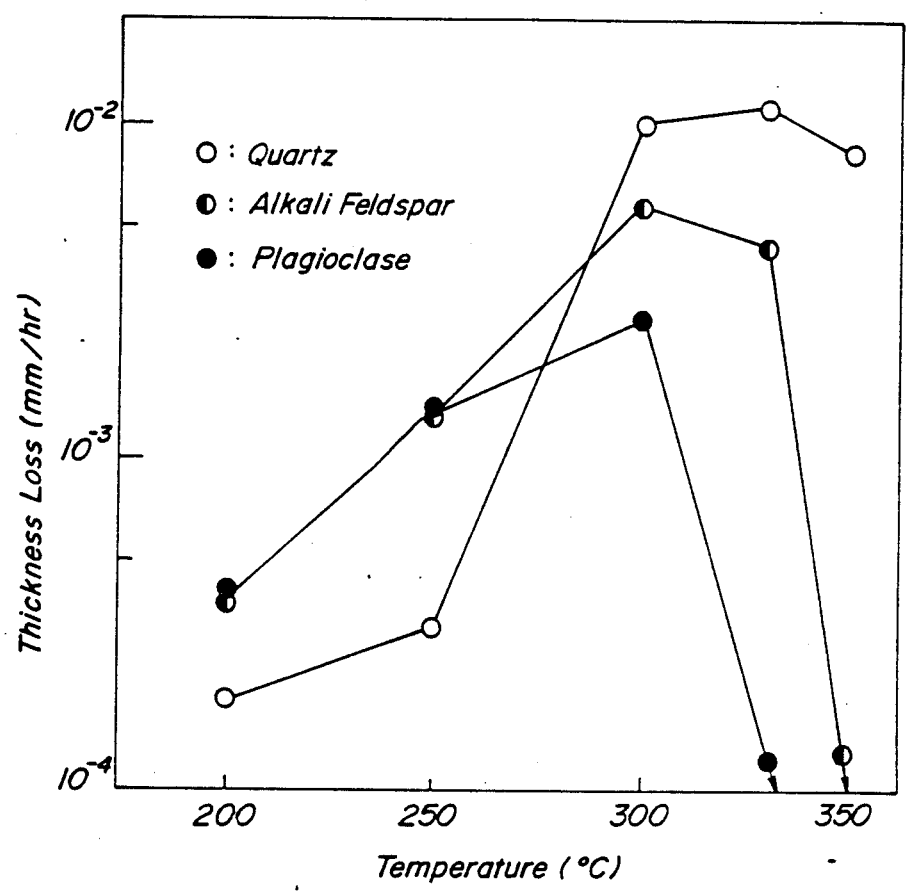
FIG. 9 is a characteristic view showing the relation between the temperature and the thickness loss shown in FIG. 5.

That is, the loss of thickness by dissolution inclines with respect to time t on both logarithmic graphs and becomes a straight line of 1. FIG. 8 shows inclinations of each straight line, all lines shows a value of approximately 1 except 350° C. of quartz, from which reactions of each mineral in the present test can be approximated by the primary reaction. Here, the simplest case is considered, inclinations of all straight lines are adjusted to be 1, a rate of loss of thickness (per unit time: Th lose/t) is obtained from the cut piece, and the relation to the temperature is plotted. The result is shown in FIG. 9.

The dissolution rate of quartz is rapidly increased from 250° C. to 300° C., but saturated immediately thereafter, and reduced at 350° C. Further, dissolution of feldspars is increased up to 300° C., but decreased when the temperature exceeds 300° C., and particularly the rate of plagioclase is particularly remarkably decreased. This is because the dissolution mechanism of mineral, particularly plagioclase is changed around 330° C. In order to clarify this mechanism, it is necessary to microscopically observe how to change the construction of mineral for constructing granite with respect to the temperature change in the process of dissolution. The result thereof is stated in the following paragraph.

(3)-3 SEM and EPMA Observation Results of dissolved sample pieces

Figure 10:
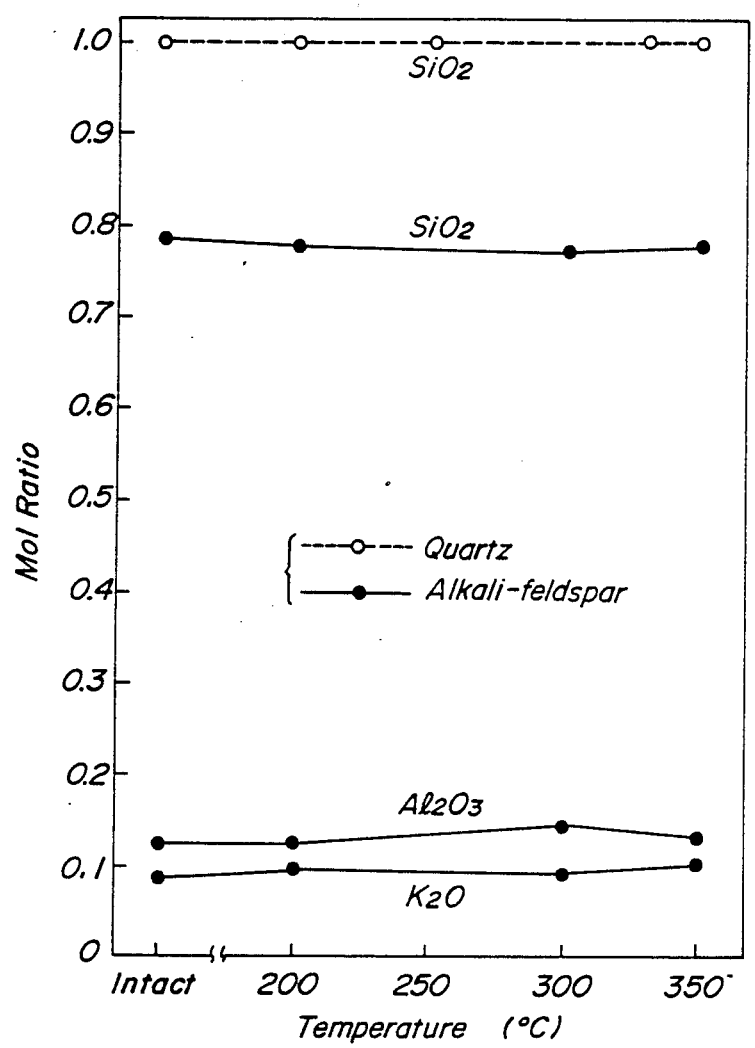
FIG. 10 is a characteristic view showing the result of surface analysis of quartz and alkali feldspar before and after the dissolution test by scanning electron microscope of the same test.

In observation, from the same reason stated in the preceding, biotite was excluded, and quartz, alkalifeldspar and plagioclase were electron beam scanned (EBS) by using EPMA. EBS is to calculate the contents of K, Na, Ca, Al, Si and the like on the surface of solved mineral in the form of an oxide and to convert them to mole ratio. The results thereof are shown in FIGS. 10 and 11. FIG. 10 is an EPMA analysis result on the surface of alkali feldspar, but suggests that there is no change of the mineral composition before and after the dissolution test, in other words, the dissolution mechanism is not changed against the temperature change, and these dissolution reactions are primary reactions. On the other hand, the result of plagioclase shown in FIG. 11 shows that the surface composition is largely changed while the temperature moves from 250° C. to 300° C., particularly the result of 330° C. shown with a circle shows that the surface is no more plagioclase. That is, it is understood that the dissolution mechanism of plagioclase cannot be represented by one reaction formula. In order to show how to change the surface form of plagioclase after dissolution reaction, FIGS. 12(a), 12(b), 12(c) and 12(d) show SEM photographs of plagioclase at the dissolution test temperature of 250° C., 300° C., 330° C. and 350° C.

The plagioclase surface at 250° C. shown in FIG. 12(a) shows that the plagioclase surface at 250° C. has substantially the same composition ratio and the surface form as those of a plagioclase matrix before dissolution and that each component element is equally solved. However, when the temperature becomes 300° C., Na and Si are selectively dissolved so as to relatively raise the mole ratio of $Al_2O_3$ and CaO, and as a result, the surface becomes a skeleton-like structure as if the frame is only remained as shown in FIG. 12(b). When the temperature is further raised to 330° C., fibrous calcium silicate of about 20 μm in length becomes deposited (FIG. 12(c)). Therefore, according to EPMA, the mole ratio of CaO and $SiO_2$ is raised (a circle of FIG. 11). At the temperature of 350° C., this fibrous deposit grows to cover not only plagioclase but also the whole sample piece, and the deposit of about 2 mm as a longer one was observed. FIG. 12(d) is the plagioclase surface at 350° C. after removing fibrous calcium silicate by ultrasonic cleaning, consisting of the form of a flat plate or a column, and it was understood that the composition is substantially the same as that of the skeleton structure at 300° C.

Figure 13:
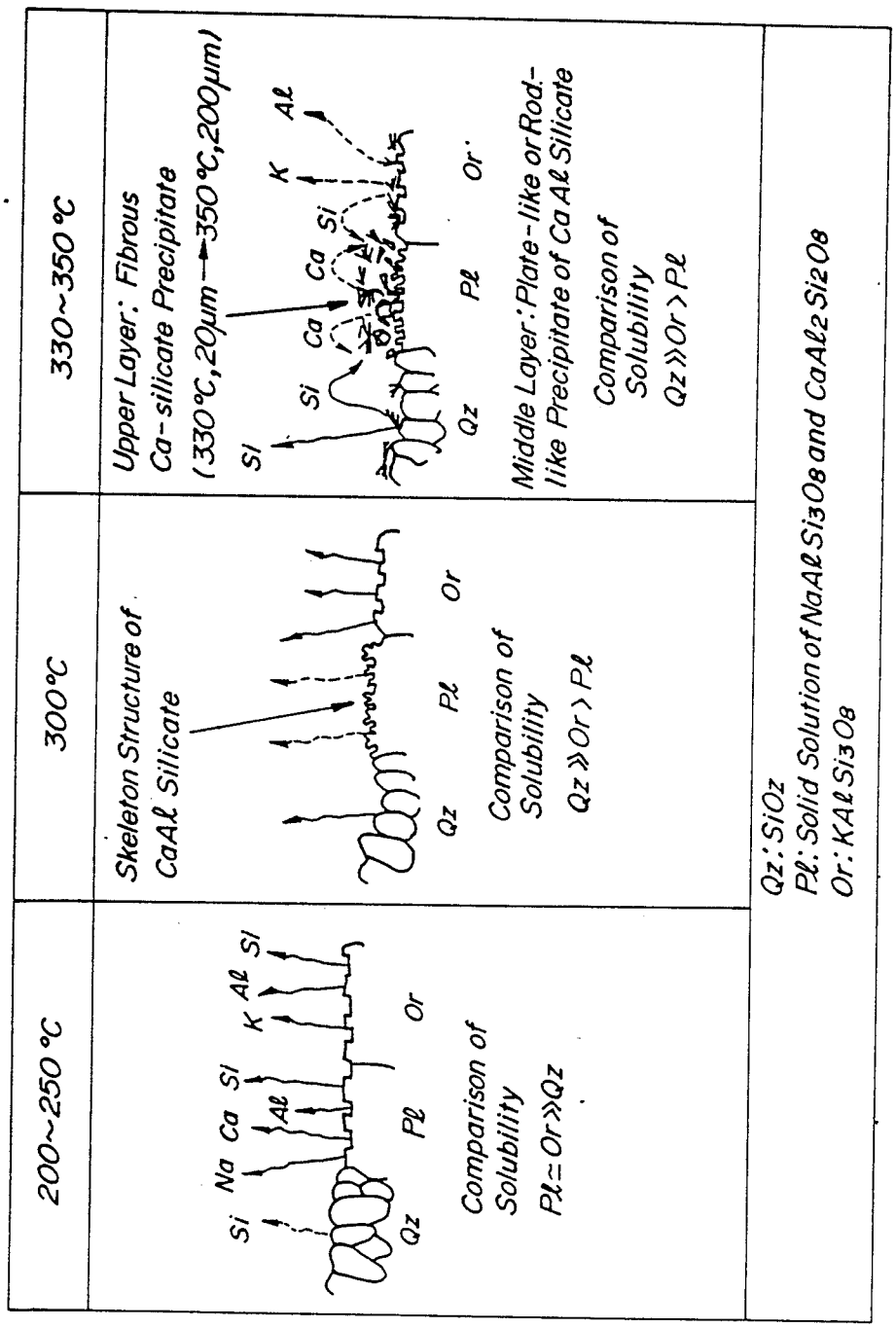
FIG. 13 illustrates chemical behaviors of granite dissolution and silicate deposition in the same test.

Here, major points of the result of SEM observation and the result of dissolution rate are schematically summarized and shown in FIG. 13.

(4) Deposition Test Result and Observation (4)-1 High Temperature Deposition Type Scale As a deposition test, there has initially been only aimed at evaluation and study of scale which was considered to be formed at a comparatively low temperature deposition testing portion on the loop downstream side, but in practice, it becomes clear that the scale is formed not only in case of accompanying the temperature fall but also in the temperature raising process. That is, as stated in the preceding, when the temperature exceeds 330° C., it was confirmed that fibrous calcium silicate of about 20 μm in length starts to cover the plagioclase surface in the form of a kind of reaction films and grows to cover the whole sample piece at 350° C. In addition to this, there was observed that fibrous calcium silicate was adhered to the sample piece jig and the experimental loop inner wall (FIG. 14). It became apparent from the result of X-ray diffraction that it is silicate which is called xonotlite, and its molecular formula has been known as $Ca_6Si_6O_{17}(OH)_2$.

Up to the present, there is no report by dividing the scale into a low temperature type and a high temperature type from the temperature condition in case of deposition, but by taking the entirely different properties of scale into consideration, the deposit at the above high temperature place is called high temperature deposition type scale.

Essentially, the point of having a deposition phenomenon at a hot place where resolution of mineral is considered to be great is important for considering deterioration with age of reduction ability of a geothermal reduction well in practice, and future study thereof is urgently required.

(4)-2 Deposition phenomenon in deposition tube (low temperature deposition type scale)

When hot water after dissolution reaction causes a deposition reaction within a deposition tube by a sudden temperature fall, it can be called a low temperature deposition type scale. As a result of observation of the deposition tube after experiment with the eye, it became apparent that a method of deposition of low temperature deposition type scale does not depend upon the quality of the deposition tube. Further, as a result of the experiment by changing the temperature gradient of the deposition tube, it was recognized that the case of large temperature gradient (inlet: 215° C., outlet: 75° C., temperature gradient: 3.11° C./cm) has much more deposition amount than the case of small temperature gradient (inlet: 230° C., outlet: 110° C., temperature gradient: 2.67° C./cm). As an example of the low temperature deposition type scale, here is shown a SEM photograph of the deposit observed by the deposition test conducted in parallel to the dissolution test at 250° C. in FIG. 15. As a result of carrying out X-ray diffraction to this deposit, no peak is shown, but a behavior inherent to amorphous substance in which a background in the vicinity of the low incident angle shows a gentle rise is shown, and as a result, it is considered to be amorphous. According to the EBS analysis of EPMA, it becomes apparent that the deposit consists of a Si-rich oxide, so that the low temperature deposition type scale obtained by the present test is identified as amorphous silica.

(5) Countermeasure to actual geothermal system

Figure 16:
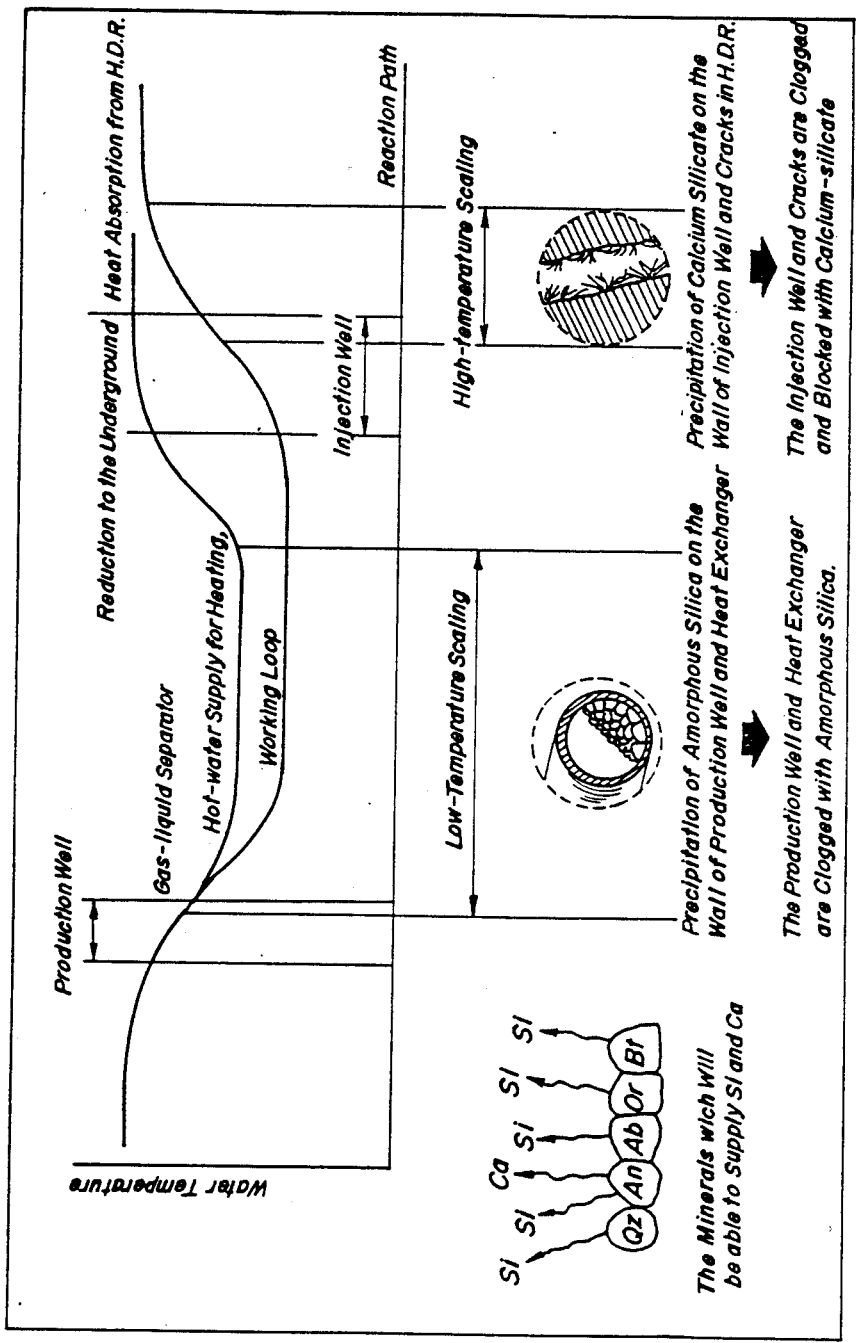
FIG. 16 is a comparative explanatory view schematically showing shape observation in actual operation in the same test.

The present fundamental test loop is a device manufactured by simulating underground surroundings for evaluating underground crack performance of the actual geothermal system, and the result observed at a laboratory shows that it is possible to reproduce a phenomenon at the field. That is, it is considered that both the cold deposition scale called into question and the hot deposition scale can be well reproduced in the present test loop. FIG. 16 shows the result of estimating and schematizing what scale can be produced at what position of the actual system based on the result obtained from the present fundamental test.

First of all, the condition of filling hot water in HDR is considered. In this case, the temperature of hot water is very high, but lowers as the temperature of hot water in a production well is raised. With the temperature fall, elements including Si dissolved in hot water cause deposition in a part of the production well and a steam separator, and further piping and the like in a dynamo loop. Hot water is utilized for heating and used for generation of electric power, but in case of the latter, the temperature drop of hot water is considerable, so that cold deposition scale is a serious problem.

At a conventional geothermal power station which is not HDR electricity generation, deposition of not only amorphous silica stated in the present test but also calcium carbonate ($CaCO_3$) is marked as a cold deposition scale, but in the present test, a dissolved sample piece was granite and a scale of $CaCO_3$ could not be observed. It is suggested that hot water utilized for heating and electricity generation is again reduced to the underground, and in its temperature rising process, a hot deposition scale is hence deposited, thereby causing problems of clogging of a reduction well and crack blockage.

(6) Conclusion of Fundamental Test

In order to examine the rock/water interaction, a test on a dissolution behavior of granite under high temperature high pressure water surroundings and a deposition test were conducted and the following information was obtained.

(1) It becomes apparent that dissolution of granite has large temperature dependency, its dissolution rate becomes maximum when the temperature is 300° C. and lowers thereafter. The factor for lowering the dissolution rate at high temperature is considered to cause by deposition of the hot deposition scale on the rock surface.

(2) As a result of examining the thickness losing rate of each mineral for constructing granite, it was found that dissolution of feldspars exceeds up to 250° C., and dissolution of quartz exceeds at more than 300° C.

(3) It became apparent from the element analysis result by EPMA that the surface composition of quartz and alkali feldspar shows no change before and after the dissolution test, and as a result, the temperature does not exert a strong influence upon the mechanism of dissolution. On the other hand, plagioclase causes selective leaching of Na and Si at 300° C. and its surface is covered with inert fibrous calcium silicate at more than 330° C., which shows that the dissolution mechanism changes by temperature.

(4) It has been well-known that problematical scaling in geothermal electric generation system has two types of hot deposition scale and cold deposition scale, but it can be considered that scaling at high temperature and low temperature obtained by the present test loop reproduces the factor of scale in the underground or terrestrial equipment and the like, and there is expected the possibility of studying the countermeasure thereof in detail in future. Particularly, under the present test conditions, it became apparent that the hot deposition scale is xonotlite.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. An underground chemical reactor system comprising
   a closed loop reactor composed of at least a reaction component inlet tube, a reaction product outlet tube and a casing pipe,
   said reaction component inlet tube being located in said casing pipe and having a closed lower end, said reaction product outlet tube being located in said reaction component inlet tube and having an open lower end, and said casing pipe includes a plurality of holes at a lower end, said closed loop reactor being located underground to reach a deep hot water source of a depth greater than 1,000 m underground for migration of hot water into said casing pipe through said plurality of holes to heat said reaction component inlet tube, and material-converting means defined by said casing pipe and said reaction component inlet tube for producing a direct chemical synthetic reaction under a rest or circulating condition of a reaction product at a high temperature underground by the hot water heating reaction component present in said reaction component inlet tube.

2. An underground chemical reactor system comprising a closed loop reactor composed of at least a reaction component inlet tube, a reaction product outlet tube and a casing pipe, said closed loop reactor being inserted underground in a deep hot water source located at a depth greater than 1,000 m underground, and said closed loop reactor including a raw material sludge tube as said reaction component inlet tube having a closed lower end located in said casing pipe, a product sludge pipe as said reaction component outlet tube having an open lower end located in said raw material sludge tube, a pump connected to an upper open end of said casing pipe, a raw material sludge supply connected to an upper open end of said raw material sludge tube, a product sludge tank connected to an upper open end of said product sludge pipe, a hole provided in said casing pipe at a distance of more than 1,000 m from the ground surface, wherein the hole is located in a vicinity of hot water formed by a natural hot water source or an artificial crushed zone so that a conversion of raw material sludge takes place by a direct chemical synthetic reaction with high temperature water from the hot water source under a rest or circulating condition of the raw material sludge.

* * * * *